United States Patent [19]

Kochem et al.

[11] Patent Number: 5,478,616
[45] Date of Patent: Dec. 26, 1995

[54] HEAT-SEALABLE FILMS AND FILM LAMINATES WITH AN ANTISTATIC COATING

[75] Inventors: Karl-Heinz Kochem, Bingen-Dietersheim; Michael Schmidt, Oestrich-Winkel, both of Germany

[73] Assignee: Hoechst Aktiengesellschaft, Frankfurt am Main, Germany

[21] Appl. No.: 73,072

[22] Filed: Jun. 8, 1993

[30] Foreign Application Priority Data

Jun. 13, 1992 [DE] Germany .......................... 42 19 410.5

[51] Int. Cl.$^6$ ............................ B32B 27/08; B32B 7/02; B05D 5/10; B65D 30/02
[52] U.S. Cl. ................... 428/35.2; 428/35.5; 428/349; 428/344; 428/411.1; 428/419; 428/922
[58] Field of Search ........................................ 428/349, 419, 428/411.1, 344, 922, 35.5, 35.2

[56] References Cited

U.S. PATENT DOCUMENTS

| | | | |
|---|---|---|---|
| 4,902,573 | 2/1990 | Jonas et al. | 428/411.1 |
| 5,093,033 | 3/1992 | Feldhues et al. | 252/500 |

FOREIGN PATENT DOCUMENTS

| | | |
|---|---|---|
| 328981 | 8/1969 | European Pat. Off. . |
| 292905 | 11/1988 | European Pat. Off. . |
| 0328983 | 8/1989 | European Pat. Off. . |
| 328982 | 8/1989 | European Pat. Off. . |
| 0440957 | 8/1991 | European Pat. Off. . |
| 0505955 | 9/1992 | European Pat. Off. . |
| 8814712.6 | 3/1989 | Germany . |
| 3834526 | 4/1990 | Germany . |
| 3838652 | 5/1990 | Germany . |

OTHER PUBLICATIONS

Elsenbaumer, R. L. et al, "Processible and Environmentally Stable Conducting Polymers", *Synthetic Metals,* 15, pp. 169–174 (1986).

Feldhues, M. et al, "Polyalkoxythiophenes Soluble Electrically Conducting Polymers", *Synth. Met.* 28 (1989) C487.

*Primary Examiner*—P. C. Sluby
*Attorney, Agent, or Firm*—Foley & Lardner

[57] ABSTRACT

A weldable and/or heat-sealable, single- or multilayer film having at least one weldable and/or heat-sealable layer, the weldable and/or heat-sealable film being provided on at least one side on one outer surface with an antistatic coating, wherein the antistatic coating has a thickness of from about 0.005 to about 0.08 μm and comprises at least about 60% by weight of a soluble, intrinsically electroconductive polymer which comprises structural units of the formula

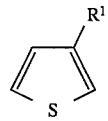

in which $R^1$ is a $C_1$- to $C_{12}$- or a $C_6$- to $C_{30}$-alkoxy group, and which has a degree of polymerization of less than about 100, where the polymer or oligomer is in oxidized form and has an appropriate number of anions to compensate for the positive charge. These films are heat-sealable, in spite of their antistatic coating.

17 Claims, 1 Drawing Sheet

HEAT-SEALABLE FILMS AND FILM LAMINATES WITH AN ANTISTATIC COATING

BACKGROUND OF THE INVENTION

Highly sensitive electronic components and printed circuit board assemblies are increasingly being packaged using plastic materials with an antistatic finish. For example, both interdepartmental transport of printed circuit board assemblies at the manufacturer and transport to the customer use films and film laminates with an antistatic finish as packaging materials.

These films are very frequently heat-sealable films made from polyethylene or laminates of polyester and polyethylene films. The polyethylene film layers are often heat-sealed to one another at temperatures between 140° C. and 200° C. allowing packaging bags to be produced. These bags are usually provided with an antistatic finish either by coating the outside and inside with chemical antistatics, for example, quaternary ammonium salts, sterically hindered amines, and the like, or by treating or filling the polyethylene film in bulk early during production, such as during extrusion, with chemical antistatics, conductive carbon black and/or graphite or metal fibers or particles.

Films which are usually not themselves heat-sealable, such as, for example, biaxially stretched polyester and polypropylene films, can be laminated with heat-sealable films, for example, polyethylene, containing an antistatic finish. The non-heat-sealable film layers are optionally provided with antistatic coatings, for example, in the form of lacquers containing chemical antistatics or in the form of vacuum coatings with metals or metal oxides, before or after lamination. It is also possible to provide the non-heat-sealable films with hot-melt adhesive coatings in thicknesses of up to a maximum of a few microns, which are themselves then again provided with an antistatic finish, usually by means of addition of chemical antistatics.

Disadvantages in the use of fillers, such as, for example, conductive carbon black/graphite and/or metal fibers/particles, is the considerably reduced transparency of the bags and in the case of conductive carbon black possible abrasion, which can cause defects, for example short-circuits, in the packaged electronic components.

When chemical antistatics are used, the frequently corrosive action of these additives on metals, the usually inadequate antistatic action (usual surface resistances greater than $10^{10}$ ohm) and the generally high dependence of the antistatic action on the ambient atmospheric humidity are disadvantageous.

Since the beginning of the 1970s, there has been worldwide interest in the synthesis of "intrinsically" electroconductive polymers. These are polymer materials which, without addition of electroconductive substances such as metal powders or fibers, conductive carbon black or the like, have an inherent conductivity. Examples of such polymers are polyacetylene, polypyrrole, polythiophene, polyaniline, polyparaphenylene, polyphenylene sulfide, and the like. However, polyconjugated bond systems of this type are only electroconductive in the so-called "doped state" i.e., they must be converted into a conductive state by an electrochemical or chemical reaction using an oxidant or reducing agent. In the doped state, however, the above-mentioned materials are all insoluble and infusible, i.e., are unsuitable for further processing.

Until a few years ago, there were only a few concrete potential applications of intrinsically electroconductive polymers. A further disadvantage was the low stability of the materials, in particular, in humid atmospheres.

In order to obtain processable electroconductive polymers, soluble, intrinsically electroconductive polymers were developed (cf. R. L. Elsenbaumer, K. Y. Jen and R. Oboodi, Synth. Met. 15 (1986) 169). In particular, doped polyalkoxythiophenes synthesized by electrochemical methods being distinguished by high stability were described by M. Feldhues et al., Synth. Met. 28 (1989) C487. These polyalkoxythiophenes are, in doped form, sparingly soluble in organic aprotic solvents, such as toluene, tetrahydrofuran, acetonitrile, dimethylformamide or N-methylpyrrolidone, and are therefore suitable as base materials for the electroconductive and/or antistatic coating of substrates. See EP-A-0 328 981, EP-A-0 257 573 and EP-A-0 328 982.

In addition, coatings can also be produced by means of aqueous or non-aqueous dispersions based on intrinsically conductive polymers, for example, dispersions based on conductive polyaniline, see DE-A-38 34 526.

However, the coating of heat-sealable films and film laminates for the production, for example, of packaging bags with intrinsically electroconductive polymers entails the risk that the heat sealability of the coated films decreases considerably as a consequence of the coating and is no longer sufficient for the desired application.

DE-A-38 38 652 and EP-A-0 307 683 describe a process for the antistatic finishing of hot-melt adhesive coatings on plastic moldings. To this end, the hot-melt adhesive coatings, for example, fusible, high-molecular-weight ethylene-vinyl acetate copolymers and mixtures thereof with resins, waxes or paraffins, and copolymers of vinyl chloride and of vinylidene chloride, or copolymers of vinyl acetate and polymethacrylates, polyurethanes and polyesters, are coated with a solution or dispersion, if desired containing binders, of an electroconductive compound, for example, an electroconductive, finely divided solid. Electroconductive substances or compounds of this type may also be, inter alia, intrinsically electroconductive polyheteroaromatic compounds, conductive carbon blacks, metal oxides or metal powders. Additional binders may serve to improve the adhesive bond by means of heat sealing and/or high-frequency (HF) welding.

However, it is generally known that coatings of this type which contain infusible electroconductive materials, such as, for example, doped, intrinsically conductive polymers, and are not applied to hot-melt adhesive coatings, but instead directly to plastics, in particular films, which are usually themselves heat-sealable, thermally weldable, or HF- or ultrasound-weldable, greatly diminish the heat-sealing properties of these plastics. For this reason, for example, heat-sealable polyethylene films are today usually rendered antistatic by addition of small amounts of chemical antistatics such as quaternary ammonium salts, alkylsulfonates, alkyl sulfates, alkyl phosphates, fatty acid esters, fatty acid ethers, and the like. These antistatics attract ambient moisture due to their hydrophilic properties and thus generate ions and conductivity. However, the surface resistance achieved in this way is usually very high, on the order of $\geq 10^{10}$ ohm, many of these substances have a corrosive action on metal parts, and the antistatic action is humidity-independent. However, antistatics of this type only reduce the heat-sealability slightly.

EP-A-0 292 905 and EP-A-0 328 981 which are both hereby incorporated by reference, describe coating compositions for the antistatic finishing of films, which compositions contain one or more binders and from 10% to 100% by weight of an intrinsically electroconductive, infusible, electrochemically synthesized oligomer which, in the oxidized form, is completely soluble in polar aprotic solvents at room temperature and has been obtained, inter alia, from structural units of the formula

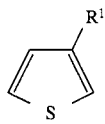

in which $R^1$ is a $C_1$- to $C_{12}$-alkoxy group (EP-A-0 292 905) or a $C_6$- to $C_{30}$-alkoxy group (EP-A-0 328 981). These electroconductive oligomers contain, in their oxidized form, an appropriate number of anions, preferably anions of the conductive salt employed in the electrolysis preparation process, in order to compensate for the positive charges on the oligomer chain. Examples of the anions are $BF_4^-$, $PF_6^-$, $SbF_6^-$, $SbCl_6^-$, $FeCl_4^-$, $[Fe(CN)_6]^{3-}$, and the like.

DE-U-88 14 712.6 describes multilayer films which are provided with layers of these conductive polymers or oligomers. Heat-sealing properties of such multilayer films, inter alia, polyester/polyethylene systems are not described therein.

Kunststoffe 82 (1992), 22 describes the coating of a polyethylene terephthalate film with polyethoxythiophene (PEOT). The coating was carried out by intaglio printing with a lacquer having a solids content of from 4% to 8% at an application rate of from 1 to 4 $g/m^2$, so that the dry thickness of this antistatic coating was at least 100 nm.

Experiments have now shown that the above-described coating compositions applied in dry thicknesses of 100 nm or more, generally reduce the heat-sealability of the previously heat-sealable films so much that heat-sealing or welding by means of heat, ultrasound or high results.

Accordingly, if it is desired to utilize the heat-sealing properties of a film of this type, care must be taken that no coating is applied to the film edges to be heat-sealed or welded, which requires a very complex procedure since a separate coating device, for example in the form of especially engraved intaglio printing rollers, must be available for every film width that is called for.

SUMMARY OF THE INVENTION

Accordingly, the object of the present invention is to provide films or multilayer films which a) have good antistatic properties, b) simultaneously have good heat-sealing properties, and c) are inert toward materials which come into contact with such films.

It is also an object of the present invention to provide a process for producing a film having these desired characteristics.

In accomplishing the foregoing objectives, there has been provided, in accordance with one aspect of the present invention a single-layer or multilayer film having an outer weldable or heat-sealable layer, wherein the weldable or heat-sealable layer has on an outer surface an antistatic coating having a thickness of about 0.005 μm to about 0.08 μm and comprises at least about 60% by weight of a soluble, intrinsically electroconductive polymer or oligomer which comprises repeating units of the formula

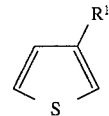

in which $R^1$ is a ($C_1$ to $C_{30}$)-alkoxy group, and which has a degree of polymerization of less than about 100, and wherein the polymer or oligomer is in oxidized form and contains anions to compensate for the positive charge.

In accordance with a second aspect of the present invention, there has been provided a process for the production of a film as described above, which comprises coating a single- or multilayer film having at least one external heat-sealable layer with a solution or suspension on the surface of this heat-sealable layer, where the solution or suspension contains a soluble, intrinsically electroconductive polymer or oligomer which comprises structural units of the formula

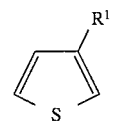

and has a degree of polymerization of less than about 100, where the polymer or oligomer is in oxidized form and has an appropriate number of anions to compensate for the positive charge, so that the coating formed by application of the solution or suspension has, after drying, a thickness of from about 0.005 μm to about 0.08 μm.

Further objects, features, and advantages of the present invention will become apparent from the detailed description of preferred embodiments that follows.

DETAILED DESCRIPTION OF PREFERRED EMBODIMENTS

Figure 1:
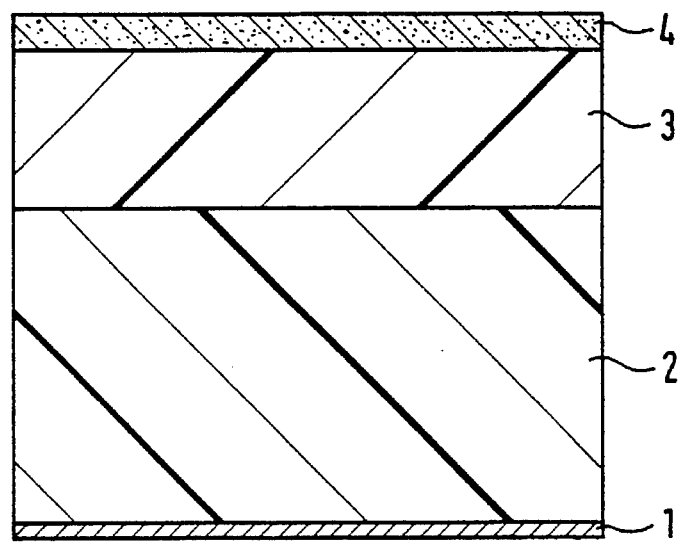
FIGS. 1 and 2 are examples of film laminates according to the present invention.

It has now been found that, surprisingly, the coating containing the above-mentioned intrinsically electroconductive infusible oligomers affects the heat-sealability and weldability of the films only insignificantly if the dry thickness of the applied coating is less than 0.08 μm, preferably less than 0.05 μm, and the degree of polymerization of the intrinsically electroconductive poly(alkoxythiophene) is <100, preferably <50. The effect on the sealability and weldability at most is such that the strength is not lower than about 10 N/15 mm.

Accordingly, the invention relates to a weldable and/or heat-sealable, single- or multilayer film having at least one outer weldable and/or heat-sealable layer, the weldable and/or heat-sealable film being provided on at least one side with an antistatic coating, wherein the antistatic coating has a thickness of from 0.005 to 0.08 μm and comprises at least 60% by weight, preferably at least 75% by weight, of a soluble, intrinsically electroconductive polymer or oligomer which comprises structural units of the formula

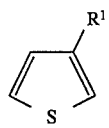

in which $R^1$ is a $C_1$- to $C_{12}$- or a $C_6$- to $C_{30}$-alkoxy group, and which has a degree of polymerization of <100.

Any weldable and/or heat-sealable films known in the art can be used in the present invention. The material can inherently be weldable and/or heat-sealable, or a layer or coating having these properties can be applied to a material not inherently weldable and/or heat-sealable. Conventional weldable or heat-sealable films include, for example: films made from polyvinyl chloride, in particular rigid PVC, polypropylene, high- and low-density polyethylene, and amorphous polyester, and monoaxially or biaxially oriented films made from any thermoplastic materials, to which a heat-sealable layer has been applied. Such heat-sealable layers can, include any known in the art, for example, $C_2/C_3$-olefin copolymers, $C_2/C_3/C_4$-olefin terpolymers, polyesters and copolyesters, ethylene polymers, ethylene-vinyl acetate copolymers, polyvinylidene chloride, and the like.

The antistatic coating of these films may be applied in any desired manner to the heat-sealable and/or weldable layer. In particular, it may be applied by first dissolving the above-described intrinsically electroconductive oligomer in a suitable solvent. The content of the polymer and oligomer generally being a maximum of about 10% by weight, preferably from about 0.1% to about 6% by weight, particularly preferably from 0.5% to 3% by weight (based on the weight of the solution). Additional additives can then be added to this solution.

Examples of such additives for solvent-containing coating systems include:

Flow-control agents: such as acrylic polymers or acrylic copolymers (for example, Edaplan LA 400, Münzing Chemie; Additol XL 480, Hoechst AG) or high-boiling compounds, such as butyl glycol or silicone oils or resins (for example, Edaplan LA 411, Münzing Chemie)

Adhesion promoters: such as chlorinated polyolefins (for example, CP 515-2, Eastman Kodak) or highly disperse silicic acids (for example, Aerosil 200, Degussa) or polyurethane resins Wetting agents: such as nonionic acetylenediols (for example, Surfynol 104, Air Products) or fluorinated surfactants (for example, Fluowet grades, Hoechst AG).

In addition, it is in principle possible to add further binders to the solution of electroconductive polymer or oligomers. These binders may also be materials which are themselves used for production of heat-sealable layers as described above. It is not necessary here for these binders and additional additives to be dissolved themselves. For coating purposes, a simple dispersion of these constituents is sufficient.

After the solution or dispersion has been prepared, the substrate film is coated with this solution in any suitable manner, for example, by knife coating, intaglio printing, flexographic printing or spraying, and the solvent is then evaporated by means of heat, e.g., thermal or IR.

The low coating thickness and use of polymers or oligomers having a low degree of polymerization means that the mixing of the molten plastic material of the substrate film is not significantly affected in the zone to be sealed, and the content of non-sealable material, in particular the conductive oligomer or polymer, in the melting zone is low. To this end, the coating thickness should be chosen depending on the substrate film.

The dried coating is highly transparent often with a pale blue coloration and is antistatic, with a surface resistance (depending on the coating thickness), generally of between about $10^5$ ohm and about $10^{11}$ ohm, preferably between about $10^6$ ohm and about $10^9$ ohm, it being possible to vary the surface resistance by varying the coating thickness or, if additional binders are used, by varying the content of conductive polymer or oligomer in the solution. The films, either as monofilms or as laminates with other films, can be used as antistatic packaging materials, where the heat-sealability or weldability enables the production of bags or peelable cover films of blister packs.

The present invention therefore relates to weldable or heat-sealable films and film laminates having at least one weldable or heat-sealable layer on one outer side of the laminate, the weldable or heat-sealable films and film laminates being provided on one or both sides with an antistatic coating which has a thickness of from 0.005 μm to 0.08 μm, preferably between 0.01 μm and 0.05 μm, and comprises at least 60% by weight, preferably at least 75% by weight, of a soluble, intrinsically electroconductive polymer or oligomer which comprises structural units of the formula

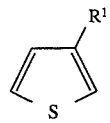

in which $R^1$ is a $C_1$- to $C_{12}$-, preferably $C_1$- to $C_4$- or a $C_6$- to $C_{30}$-, preferably $C_{12}$- to $C_{16}$-alkoxy group, and which has a degree of polymerization of <100, preferably <50.

In addition, this electroconductive polymer or oligomer, in its oxidized form used here, has an appropriate number of anions, any anions being useful with preference to anions of the form $[BF_4]^-$, $[PF_6]^-$, $[SbF_6]^-$, $[SbCl_6]^-$, $[FeCl_4]^-$, $[Fe(CN)_6]^{3-}$, in order to compensate for the positive charges on the polymer chain, that is, so as to have a polymer which is neutral overall.

In addition, the antistatic coating may contain any desired binders, wetting agents, flow-control agents, adhesion promoters, and other additives. However, the total proportion of these additives in the coating should generally be a maximum of about 40% by weight, preferably a maximum of 25% by weight. Films and film laminates coated in this way may, in addition to the antistatic layer, also contain further functional layers, but at least. one heat-sealable or weldable side must be provided with the above-described antistatic coating. Additional functional layers can include any known in the art, for example, further antistatic layers, conductive layers, such as, for example, metal layers, optical interference layers, dielectric layers, semiconductor layers, organic and inorganic gas-barrier layers, and the like.

Figure 2:
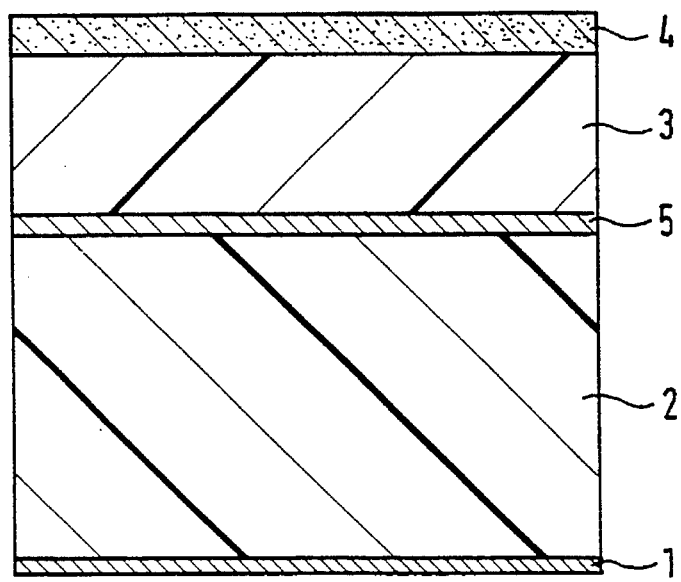

Preference is given to film laminates as shown in FIGS. 1 and 2. In these figures, 1 denotes the above-described antistatic coatings, 2 denotes a heat-sealable or weldable film, for example made of polyethylene, 3 denotes a base film, made, for example, of biaxially oriented polyester or polypropylene, for further functional layers 4 and 5. The outer functional layer 4 is preferably an antistatic coating of any desired type having a surface resistance of less than about $10^{11}$ ohm, preferably an antistatic coating as described in EP-A-0 292 905 and EP-A-0 328 981 which are both hereby incorporated by reference. The inner functional layer 5 is preferably a layer made from metals such as Al, Ag, Cu, Au, Cr, Ni, Fe, Zn, Sn, and the like, and metal oxides thereof, preferably transparent, wherein the metals are preferably applied by vacuum vapor deposition to a preferred maximum thickness of about 50 nm.

Film laminates, preferably having the structure shown in FIGS. 1 and 2, can be produced either by adhesive lamination, heat sealing, coextrusion or extrusion coating. In the first two cases, an additional layer (adhesive/heat-sealing layer) is present between 2 and 3 (FIG. 1) or 2 and 5 (FIG. 2); in the case of laminates containing more than two films, additional adhesive and heat-sealing layers are correspondingly present between the individual film layers.

The film laminate generally has an overall thickness of from 1 µm to 400 µm, preferably from 12 µm to 200 µm.

The invention furthermore relates to a process for the antistatic finishing of heat-sealable and/or weldable films and film laminates by coating the heat-sealable and/or weldable side or sides. The coating may be accomplished in any desired manner, but preferably is a solution or dispersion process, wherein a solution or dispersion comprising from about 90% to about 99% by weight, preferably from about 94% to about 99% by weight, of one or more solvents and from about 0.5% to about 10% by weight, preferably from about 0.5% to about 6% by weight, particularly preferably from about 1% to about 4.5% by weight, of substances dissolved and/or dispersed therein, where this proportion of substances comprises from about 60% to about 100% by weight, preferably from about 75% to 100% by weight, of a soluble, intrinsically electroconductive polymer or oligomer comprising structural units of the formula

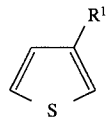

in which $R^1$ is a $C_1$- to $C_{12}$-, preferably $C_1$- to $C_4$- or a $C_6$- to $C_{30}$-, preferably $C_{12}$- to $C_{16}$-alkoxy group, and which has a degree of polymerization of <100, preferably <50, and from 0% to 40% by weight, preferably from 0% to 25% by weight, of dissolved or dispersed binders, wetting agents, flow-control agents, adhesion promoters and/or other additives.

The coating of the solution or dispersion to be applied must be carried out so that the wet application rate and the solids content of the solution or dispersion are selected so that, after evaporation of the solvents, a dry coating thickness of between about 0.005 µm and about 0.08 µm, preferably between about 0.01 µm and about 0.05 µm, is formed on the substrate film, it being possible to employ conventional coating methods for solutions and dispersions, such as, for example, knife coating, printing methods (offset printing, intaglio printing, flexographic printing), smooth-roller coating, curtain coating or spray coating. After the coating of the Substrate film, the solvent is evaporated thermally or by IR irradiation. The wet application rate and the solids content can be determined by simple routine experiments.

The invention furthermore relates to the use of films and film laminates antistatically coated in this way for the production of packaging materials having a protective function against electrostatic charges, in particular of heat-sealable and/or weldable packaging bags and heat-sealable or weldable film tapes, which are used as cover tapes for blister packs, for packaging electronic components and assemblies, printed circuit board assemblies and individual electronic components such as transistors, resistors, capacitors, and the like. If laminates which contain, as described above, further functional layers (for example metal layers, barriers) are used, further property profiles can be achieved in addition to the antistatic action. Sealing and welding methods which can be employed are all conventional methods, such as, for example, thermal methods and ultrasound and high-frequency methods.

The invention is described in greater detail below with reference to the following non-limiting examples.

EXAMPLE 1

76.0 g of a poly(ethoxythiophene) doped with $BF_4$ anions, referred to below as $PEOT+BF_4$, are dissolved at room temperature in a mixture of 791 g of acetone and 7118.8 g of N-methylpyrrolidone (NMP). The preparation of $PEOT+BF_4^-$ is described in EP-A-0 328 981 which is hereby incorporated by reference. Analysis by mass spectrometry shows that it is an oligomer having a mean chain length of 9 monomer units. The specific electrical conductivity is about 1.2 S/cm (measured by the four-point method on a compressed powder disc). As additives, 10 g of CP 515-2 (chlorinated polyolefin from Eastman Kodak; 40% strength in xylene), 4 g of Additol XL 480 (flow assistant from Hoechst AG) and 0.24 g of Aerosil TT 600 (highly disperse silicic acid from Degussa; antiblocking agent) are added to the solution with vigorous stirring (total solids content 1.05% by weight).

The batch was then filtered through a glass suction filter (porosity 3) and shaken at 280 cycles/min in a horizontal laboratory shaker. A low-density polyethylene film (LDPE type K51 from M&W; thickness 50 µm; width 600 mm) was continuously coated with this solution by intaglio printing and dried by means of hot air in two steps (90° C. and 100° C.). The full-area grid roll used for the intaglio printing has an engraving depth of 7 µm and a grid density of 70 per cm. The wet application rate was 1.3 g/m², which corresponds to a dry coating thickness of about 15 nm. The coating speed was between 45 m/min and 50 m/min.

The coated polyethylene film has a surface resistance of from $9\times10^6$ to $1\times10^7$ ohm (DIN 53482 using a spring-tongue electrode) and a transparency of 84% (ASTM 1003-61).

The coated polyethylene film was subsequently laminated continuously on the non-coated side, on a laminating unit, with a 12 µm thick polyester film (Hostaphan RN 12 from Hoechst AG). In a second laminating experiment the above coated polyethylene film was laminated on the non-coated side with a 12 µm thick polyester film of the same type as above which had been metallized on one side. In both cases a two-component polyurethane adhesive (Liofol UK 2640/6800 from Henkel; diluted to 34% strength in ethyl acetate) was used for lamination. The polyester films were each provided on one side with an antistatic coating, as described in EP-A- 0 292 905 (surface resistance $5\times10^6$ ohm). In the case of the metallized polyester film, this antistatic coating was on the non-metallized side. The lamination was carried out so that the antistatically coated sides of the metallized polyester and polyethylene films were on the outside.

These multilayer films were subjected to heat-sealing tests. In each case, two LDPE sides were heat-sealed using a heat-sealing unit (Brugger HSD/ET) at a sealing pressure of 5.5 bar, sealing temperatures between 160° C. and 200° C. and sealing times of 0.5 and 1.0 second. The seal seam strengths were as follows:

| Sealing temperature (°C.) | Sealing time (sec) | Seal seam strength (N/15 mm) |
| --- | --- | --- |
| 160 | 1.0 | 10 |
| 180 | 0.5 | 17 |
| 180 | 1.0 | 20 |
| 200 | 0.5 | 20 |
| 200 | 1.0 | 21 |

The seal seam strengths were measured on an Instron tensile tester at a peel rate of 200 mm/min.

The values for the seal seam strengths allow these multilayer films to be used, for example, for the production of packaging bags with antistatic coatings on both sides. Use of the metallized polyester film allows, in addition, a screening action against electromagnetic alternating fields to be achieved.

EXAMPLE 2

72 g of PEOT+BF$_4^-$ are dissolved in 7000.0 g of N-methylpyrrolidone with stirring, and in parallel 8.0 g of Surfynol 104 (dispersion assistant and wetting agent from Air Products), 1.6 g of Aerosil TT 600 (highly dispersed silicic acid from Degussa) as antiblocking agent and 20.0 g of CP 515-2 are dissolved or dispersed, using an ultrasound disintegrator, in 894.4 g of N-methylpyrrolidone. During this operation, warming of the batch to about 60° C. is advantageous so that the chlorinated polyolefin CP 515-2 dissolves. The two batches are then combined with stirring. The batch has a solids content of 1.1% and a PEOT+BF$_4^-$/CP 515-2 ratio of 9:1. The entire solution is filtered through a glass suction filter of porosity 3.

This solution, prepared as described above, was used to coat, over the entire area, a LLDPE film (linear low-density polyethylene; grade K 4410, M&W, thickness 50 μm, with 600 mm) by intaglio printing (intaglio printing cylinder 70 with an etch depth of 7 μm), and the applied lacquer was dried at 90° C. in a drying tunnel. The wet application rate was 1.3 g/m², which corresponds to a dry coating thickness of about 15 nm. The coating speed was between 45 m/min and 50 m/min. The coated LLDPE film has a surface resistance of 3×10$^7$ ohm (DIN 53482 using a spring-tongue electrode) and a transparency of 85% (ASTM 1003-61). The LLDPE film coated as described above was laminated with an adhesive in a laminating machine with a polyester film with a thickness of 12 μm which was likewise coated with PEOT+BF$_4^-$ (see Example 1, Hostaphan RN 12 from Hoechst AG), with both the coated sides facing outward.

The laminating adhesive used was a two-component polyurethane adhesive, Liofol UK 2640/6800 (Henkel), diluted to 34% with ethyl acetate. The multilayer film produced as described above has a surface resistance on the LLDPE side of 3×10$^7$ ohm and on the polyester film side of 5×10$^6$ ohm, and a transparency of 82% (ASTM 1003-61). This multilayer film was subjected to heat-sealing tests. In each case, the LLDPE film sides were sealed using a heat-sealing unit (Brugger HSG/ET) at a sealing pressure of 5.5 bar and sealing temperatures of from 160° C. to 220° C. for sealing times of half and one second. The seal seam strengths were as follows:

| Sealing temperature (°C.) | Sealing time (sec) | Seal seam strength (N/15 mm) |
| --- | --- | --- |
| 160 | 1.0 | 12 |
| 180 | 0.5 | 12 |
| 180 | 1.0 | 18 |
| 200 | 0.5 | 25 |
| 200 | 1.0 | 30 |

The seal seam strengths were measured on an Instron tensile tester at a peel rate of 200 mm/min.

Comparative Example 1

A solution of the following composition was prepared analogously to Example 1:

| |
| --- |
| 19.45 g of acetone |
| 175.06 g of NMP |
| 4.75 g of PEOT+BF$_4^-$ |
| 0.625 g of CP 515-2 |
| 0.015 g of Aerosil TT 600. |

This corresponds to a solids content of 2.5%, otherwise with the same relative composition as in Example 1. In addition, 0.1 g of Additol XL 480 is added to the batch as flow-control agent (same concentration, based on the overall batch, as in Example 1).

This batch was filtered through a glass suction filter (porosity 3) and shaken in a horizontal laboratory shaker at 270 cycles/min.

A multilayer film (DIN A4) made from Hostaphan RN 12 and LDPE, grade K51 (M&W; thickness 50 μm) having the above-described composition was coated on the PE side by means of a 4 μm hand coater (application rate=4 g/m²), the coating was dried (fan-assisted drying cabinet, 85° C./2 min). A surface resistance of 2×10$^5$ ohm was measured and the dry coating thickness was about 100 nm and hence outside the inventive range. Heat-sealing tests were carried out analogously to Example 1.

| Sealing temperature (°C.) | Sealing time (sec) | Seal seam strength (N/15 mm) |
| --- | --- | --- |
| 160 | 1.0 | 1 |
| 180 | 0.5 | 1 |
| 180 | 1.0 | 2 |
| 200 | 0.5 | 2 |
| 200 | 1.0 | 3 |

Comparative Example 2

Solution analogous to Example 2, having the following composition:

| |
| --- |
| 193.15 g of NMP |
| 4.50 g of PEOT+BF$_4^-$ |
| 1.25 g of CP 515-2 |
| 0.10 g of Aerosil TT 600. |

Solids content 2.57%; same relative composition as in Example 2. In addition, 0.2 g of Additol XL 480 is added as flow-control agent (same concentration, based on the overall batch, as in Example 2).

Application as in Comparative Example 2 to a multilayer film (DIN A4) made from Hostaphan RN 12 and LLDPE film, grade K 4410 (M&W). Coating on the PE side.

| Surface resistance: | 1 × 1-hu 5 ohm |
|---|---|
| Transparency: | 63% (ASTM 1003-61) |
| Dry coating thickness: | 100 nm |

The seal seam strengths were as follows:

| Sealing temperature (°C.) | Sealing time (sec) | Seal seam strength (N/15 mm) |
|---|---|---|
| 160 | 1.0 | 2 |
| 180 | 0.5 | 2 |
| 180 | 1.0 | 2 |
| 200 | 0.5 | 3 |
| 200 | 1.0 | 4 |

What is claimed is:

1. Film having an outer weldable or heat-sealable layer, wherein the weldable or heat-sealable layer has on an outer surface an antistatic coating having a thickness of about 0.005 μm to about 0.08 μm which comprises at least about 60% by weight of a soluble, intrinsically electroconductive polymer which comprises repeating units of the formula

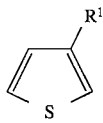

in which $R^1$ is a ($C_1$ to $C_{30}$)-alkoxy group, and which has a degree of polymerization of less than about 100, and wherein the polymer is in oxidized form and contains anions to compensate for the positive charge.

2. Film as claimed in claim 1, wherein the antistatic coating has a thickness of from about 0.01 μm to about 0.05 μm.

3. Film as claimed in claim 1, wherein the antistatic coating comprises at least 75% by weight of the intrinsically electroconductive polymer which comprises structural units of the formula

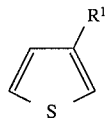

4. Film as claimed in claim 1, wherein $R^1$ is a ($C_1$–$C_4$)- or a ($C_{12}$–$C_{16}$)-alkoxy group.

5. Film as claimed in claim 1, wherein the degree of polymerization of the intrinsically electroconductive polymer is less than about 50.

6. Film as claimed in claim 1, wherein the surface resistance of the antistatic coating is between about $10^5$ ohm and about $10^{11}$ ohm.

7. Film as claimed in claim 1, wherein the antistatic coating contains up to about 40% by weight of additives.

8. Film as claimed in claim 7, wherein the additives are selected from one or more of binders, wetting agents, flow-control agents, lubricants, adhesion promoters, and mixtures of said substances.

9. Film as claimed in claim 1, which has an overall thickness of from about 1 μm to about 400 μm.

10. Film as claimed in claim 9, which has an overall thickness of from about 12 to about 200 μm.

11. Film as claimed in claim 1, having a seal seam strength of at least about 10 N/15 mm.

12. An antistatically coated film, which comprises a base film on which is applied a heat-sealable layer, wherein an antistatic coating is applied on the heat-sealable layer, and wherein a seal seam strength after sealing of the heat-sealable layer is at least about 10 N/15 mm.

13. A heat-sealable antistatic bag or screening bag comprising a film as claimed in claim 1.

14. A blister pack cover comprising a film as claimed in claim 1.

15. An antistatic adhesive tape comprising a film as claimed in claim 1.

16. A laminate comprising a non-heat sealable base layer, and the film of claim 1 adhered to said non-heat sealable base layer.

17. A laminate of claim 16, wherein said non-heat sealable base layer has an antistatic covering thereon.

* * * * *